United States Patent [19]

White et al.

[11] 3,933,621

[45] Jan. 20, 1976

[54] CATALYTIC CRACKING PROCESS USING STEAMED COGELLED SILICA ALUMINA CATALYST

[75] Inventors: Robert J. White, Pinole; Donald A. Hickson, Irvine; Charles E. Rudy, Jr., El Cerrito, all of Calif.

[73] Assignee: Chevron Research Company, San Francisco, Calif.

[22] Filed: Oct. 24, 1972

[21] Appl. No.: 300,081

[52] U.S. Cl............... 208/120; 252/453; 252/455 R
[51] Int. Cl.²......................................... C10G 11/04
[58] Field of Search.................... 208/120; 252/453

[56] References Cited
UNITED STATES PATENTS

| 2,282,922 | 5/1942 | Ahlberg et al. | 208/120 |
|---|---|---|---|
| 2,315,024 | 3/1943 | Sturgeon | 208/120 |
| 2,317,803 | 4/1943 | Reeves et al. | 208/120 |
| 2,469,314 | 5/1949 | Ryland et al. | 252/455 R |
| 2,595,339 | 5/1952 | Den Herder et al. | 252/453 |
| 2,713,037 | 7/1955 | Kimberlin | 252/453 |
| 2,804,433 | 8/1957 | Herver et al. | 252/453 |
| 2,870,082 | 1/1959 | Sieg et al. | 208/120 |
| 2,872,410 | 2/1959 | Erickson | 208/120 |
| 3,010,914 | 11/1961 | Braithwaite et al. | 252/455 R |
| 3,023,172 | 2/1962 | Innes et al. | 252/455 R |
| 3,131,156 | 4/1964 | Wilson et al. | 252/455 R |
| 3,157,591 | 11/1964 | De Feo et al. | 208/120 |
| 3,224,961 | 12/1965 | Erickson et al. | 208/120 |
| 3,413,238 | 11/1968 | Gladrow et al. | 252/455 |
| 3,425,956 | 2/1969 | Baker et al. | 252/455 Z |
| 3,462,377 | 11/1969 | Plank et al. | 252/455 |
| 3,496,116 | 2/1970 | Anderson et al. | 252/453 |
| 3,668,114 | 6/1972 | O'Keefe et al. | 208/120 |
| 3,717,587 | 2/1973 | Hepner | 252/455 |
| 3,860,532 | 11/1975 | Takase et al. | 252/453 |

OTHER PUBLICATIONS

Thomas "Chemistry of Cracking Catalysts" IEC41(11) 2564–2573 (Nov. 1949).

*Primary Examiner*—Delbert E. Gantz
*Assistant Examiner*—G. E. Schmitkons
*Attorney, Agent, or Firm*—G. F. Magdeburger; R. H. Davies; D. L. Hagmann

[57] ABSTRACT

A process for catalytic cracking of a hydrocarbon feedstock which comprises contacting the feedstock with a catalyst which comprises predominantly a synthetic silica-alumina matrix containing 56 to 90 weight per cent alumina and wherein the catalyst does not contain any clay constituent.

Preferably the matrix contains more than 65 weight per cent alumina. At these high alumina levels, which are about double or treble most of the current commercial cracking catalyst alumina levels, we have found that surprisingly high activity is achieved by our cracking catalyst.

5 Claims, 2 Drawing Figures

ACTIVITY VERSUS COMPOSITION
$Al_2O_3 \; SiO_2$

CATALYTIC CRACKING PROCESS USING STEAMED COGELLED SILICA ALUMINA CATALYST

BACKGROUND OF THE INVENTION

The present invention relates to catalytic cracking and an improved catalyst for use therein, particularly high alumina content catalyst, and particularly synthetic high alumina catalyst prepared by simultaneous cogellation of alumina and silica.

Catalytic cracking is a hydrocarbon conversion process in which a hydrocarbon, such as a petroleum oil fraction, is passed over a catalyst at an elevated temperature and at atmospheric or somewhat higher pressures to split higher molecular weight hydrocarbons into lower molecular weight substances, the principal end product being gasoline. The cracking temperatures are usually around 600° to 1,000°F., preferably around 900°F. The cracking catalyst is typically circulated between the catalytic cracking reaction zone and the catalyst regeneration zone or vessel. The cracking catalyst is regenerated in the regeneration zone by burning deposited carbonaceous material off the catalyst at about 900° to 2,000°F., then the regenerated catalyst is recirculated to the catalytic cracking reaction zone. Steam is formed in the regeneration step because the carbonaceous material is combusted to carbon oxides and water vapor.

Typical commercial catalytic cracking data is shown by the table below:

TABLE 1

COMMERCIAL CATALYTIC CRACKING DATA

| Operating Conditions Catalyst | Synthetic beads, 15% $Al_2O_3$ 85% $SiO_2$, 0.003% Cr |
|---|---|
| Reactor pressure | 10 psig |
| Temperature of oil vapor feed | 783°F. |
| Temperature of catalyst to reactor | 900°F. |
| Catalyst to oil ratio | 3.8 vol/vol |
| Carbon on spent catalyst | 1.12% wt |
| Carbon on regenerated catalyst | 0.04% wt |
| Feed space velocity | 1.7 LHSV* |
| Products, Weight % of Feed | |
| $H_2$, $CH_4$, $C_2H_4$, $C_2H_6$ | 1.1 |
| $C_3H_6$ | 1.5 |
| $C_3H_8$ | 1.2 |
| $C_4H_8$ | 2.1 |
| i—$C_4H_{10}$ | 3.7 |
| n—$C_4H_{10}$ | 0.9 |
| Gasoline, 33-202°C | 32.3 |
| Naphtha, 188-231°C | 4.7 |
| Fuel oil, 218-338°C | 38.8 |
| Heavy oil, 18.3°API | 10.5 |
| Coke | 3.2 |
| | 100.0 |

*LHSV = Liquid hourly space velocity, volumes of liquid feed per volume of catalyst per hour.

As can be seen from the above data, the amount of $C_3$ and $C_4$ olefins typically produced is about four weight per cent. The Table 1 data is for a plant using TCC beads; the olefin yield from a plant using typical fluidized catalyst produced by spray drying would be about 5 weight per cent.

Various methods are known for the preparation of catalytic cracking catalysts such as the commercial methods described by Ryland et al. starting at page 6 in Emmett's "Catalysis" Volume 7, Reinhold Publishing, 1960. Frequently, synthetic silica-alumina cracking catalysts are prepared by neutralizing an alkali metal silicate solution with a mineral acid, adding alum solution to the resulting hydrogel to incorporate the requisite amount of alumina in the final catalyst and precipitating the alum as alumina by the addition of a suitable base. Then the catalyst material is washed, spray dried (or formed as a bead in oil) and calcined.

As mentioned by Ryland et al, at page 9, there are numerous other methods for preparing alumina-silica catalysts including gellation of the desirable solubilized constituents under controlled conditions.

Natural clay material can be used as cracking catalysts after suitable treatment, such as acid activation. As indicated by one of the references reviewed by Ryland et al. at page 16, it is believed that the cracking activity of clay catalysts is not primarily due to the crystalline phase of the clay material but rather to an amorphous phase of the clay formed by the acid treatment. Also, it is believed that the amorphous phase of the clay formed by the acid treatment is essentially identical with a synthetic alumina-silica catalyst which in turn is believed to consist of a mixture of extremely small alumina and silica particles sharing oxygens or in intimate contact.

In many instances, because of the lower cost of clay materials, clay materials are used as a relatively inactive portion of synthetically prepared silica-alumina catalysts. That is, the clay can be used to "extend" the more expensive synthetically prepared silica-alumina. As pointed out by H. H. Voge at page 408 and 417 in Emmett's "Catalysis" Volume 6, Reinhold Publishing, 1958, a synthetic alumina-silica cracking catalyst ordinarily contains 10-25 weight per cent alumina. Ryland et al. at page 6 points out that early synthetic alumina-silica catalysts contained about 10 -12 per cent alumina, but that later high alumina catalysts were made containing about 25 per cent alumina.

An article by B. H. Loper, "Oil and Gas Journal," Apr. 25, 1955, page 115, also describes commercial results from "high alumina" catalysts which contain 25 weight per cent alumina.

The following patents disclose cracking catalysts of high alumina content:

U.S. Pat. No. 2,469,314 (Ryland et al.) 25 weight per cent alumina.

U.S. Pat. No. 3,023,172 (Innes et al.) 25 wt. per cent alumina exclusive of added low cost kaolin clay.

U.S. Pat. No. 3,010,914 (Braithwaite et al.) discloses a cracking catalyst composed of synthetic alumina-silica and added clay with the portion of alumina in the synthetic alumina-silica being 15–80 wt. per cent alumina. The clay, in general, is 20–85 wt. per cent of the final catalyst. As per example 1 of the patent, the catalyst can be made by adding aqueous acid to a solution containing sodium aluminate and kaolin clay, and then adding a solution of alum and water so that the resulting pH of the slurry is 9.5. The resulting alumina-silica composition contains about 72.5 per cent alumina and 27 per cent silica, presumably based on the entire composition which includes the kaolin clay.

U.S. Pat. No. 3,010,914 also mentions that the activity of the catalyst measured after steaming of the catalyst is of more practical value in evaluating the catalyst than the activity without steam pretreatment.

Although U.S. Pat. No. 3,010,914 discloses relatively high alumina contents for a synthetic silica-alumina catalyst-containing clay, a subsequent Braithwaite et al. patent, U.S. Pat. No. 3,034,995, suggests lower alumina contents for synthetic silica-alumina catalyst-containing clay. Thus, according to U.S. Pat. No. 3,034,995, the synthetically dry silica-alumina hydrogel portion of the clay-containing catalyst contains 5 to 45 weight per cent alumina and 55 to 95 weight per cent silica.

U.S. Pat. No. 3,131,156 (Wilson et al.) is also directed to high alumina catalyst containing up to about 30 weight per cent alumina.

Current commercial cracking catalysts have a wide range of alumina contents. For example, commercial Catalyst A (believed to contain clay) 55 weight per cent alumina; commercial Catalyst B (also believed to contain clay) 50.5 weight per cent alumina; commercial Catalyst C, 46 weight per cent alumina; commercial Catalyst D, 35 weight per cent alumina, 65 weight per cent silica in the synthetic alumina-silica matrix, but the finished catalyst also includes added crystalline zeolites (aluminosilicate molecular sieves); Catalyst E, stated to be a high alumina catalyst, 25 weight per cent alumina; Catalyst F, stated to be "low alumina", 13 wt. per cent alumina; Catalyst G, stated to be a high alumina, 25 wt. per cent alumina; Catalyst H, 13 wt. per cent alumina; Catalyst I, 10 wt. per cent alumina.

By hindsight, after carrying out our experimental work, one reference which we found to be particularly pertinent is a C. L. Thomas article, at page 2564, "Industrial and Engineering Chemistry," Volume 41, No. 11. This article discloses a peak in cracking activity at alumina to silica ratios which approach the alumina content required in the synthetic alumina-silica matrix of the cracking catalyst to which the present specification is directed. In addition to the necessity to take the Thomas reference with the other prior art as a whole, we also note that the Thomas reference does not point out whether or not the catalysts tested by Thomas were steamed prior to testing. FIG. 1 from the Thomas reference is presented in revised form as part of FIG. 1 of the present specification and is discussed further hereinbelow.

SUMMARY OF THE INVENTION

According to the present invention a process is provided for catalytic cracking of a hydrocarbon feedstock which comprises contacting the feedstock with a catalyst which contains predominantly a synthetic silica-alumina matrix containing 56 to 90 weight per cent alumina and wherein the catalyst does not contain any clay constituent.

The present invention is based on our finding that a high alumina content, greater than 56 weight per cent alumina, gives higher cracking activity than conventional cracking catalysts which, in prior commercial use, have essentially always had less than 56 weight per cent alumina. The present invention excludes catalysts prepared using clays or incorporating clays as part of the catalyst. Clays tend to lower the activity of the catalyst, whereas the present invention is directed to a high activity catalyst. Molecular sieves (crystalline aluminosilicate zeolites) can be included with the synthetic silica-alumina matrix of the catalyst of the present invention as the molecular sieves usually tend to increase the cracking activity of the catalyst.

U.S. Pat. No. 3,425,956 discloses the use of crystalline zeolites for promoting synthetic silica-alumina catalytic cracking catalysts. Among the broad disclosure of this patent is mentioned synthetic silica-alumina matrices containing up to about 95 weight per cent alumina, but U.S. Pat. No. 3,425,956 does not disclose any special advantage of catalysts restricted to having 56 to 90 weight per cent alumina in the synthetic silica-alumina matrix. The example catalyst in U.S. Pat. No. 3,425,956 had about 15 weight per cent alumina, and they were compared to commercial silica-alumina catalysts having about 13 weight per cent alumina, and in the case of one commercial high alumina catalyst, 27.4 wt. per cent alumina.

Although the catalyst of the present invention can contain an added crystalline zeolite, in any case the synthetic silica-alumina matrix is the predominant portion of the finished catalyst used in the process of the present invention. The statement that the catalyst "comprises predominantly a synthetic silica-alumina matrix" means that the synthetic silica-alumina matrix accounts for at least 50 weight per cent of the catalyst. Preferably the synthetic silica-alumina matrix is at least 75 wt. per cent of the catalyst and more preferably at least 85 weight per cent of the final catalyst. The term "synthetic" silica-alumina means that the silica-alumina is made (synthesized) from a silicon (usually silicon compound) containing material and an aluminum (usually aluminum compound) containing material, as opposed to being a naturally occurring clay, and as opposed to being an acid treated natural clay.

As indicated earlier, the catalyst of the present invention preferably does not contain any clay constituents such as the kaolin and other natural clays.

According to a preferred embodiment of the present invention the catalyst consists essentially of synthetic silica-alumina.

The catalyst of the present invention, and especially the catalyst consisting essentially of synthetic silica-alumina in accordance with the present invention, has been found to be particularly advantageous for use in catalytic cracking directed to the production of relatively high amounts of olefins, that is, above about 6 weight per cent olefins based on product, preferably above about eight weight per cent olefins based on product.

Preferably the synthetic silica-alumina matrix of the catalytic cracking catalyst used according to the present invention contains at least 60 weight per cent alumina, and still more preferably, at least 65 weight per cent alumina.

Suitable catalytic cracking conditions for use in the process of the present invention include a temperature between 800° and 1200°F., a pressure between atmospheric and 200 psig, and a hydrocarbon feedstock to the catalytic cracking reaction zone boiling within the limits of about 150° to 1000°F.

The present invention is directed to the catalyst composition as well as the use of the catalyst in catalytic cracking.

According to a preferred embodiment of the present invention, the catalytic cracking catalyst is prepared by steps comprising a. forming an acidic solution containing aluminum and silicon;

b. cogelling aluminum and silicon compounds in the solution by adding a base to obtain a catalyst precursor; and c. washing, drying, and calcining the catalyst precursor to obtain the catalyst containing the synthetic silica-alumina matrix.

FURTHER DESCRIPTION OF THE DRAWINGS

Figure 1:
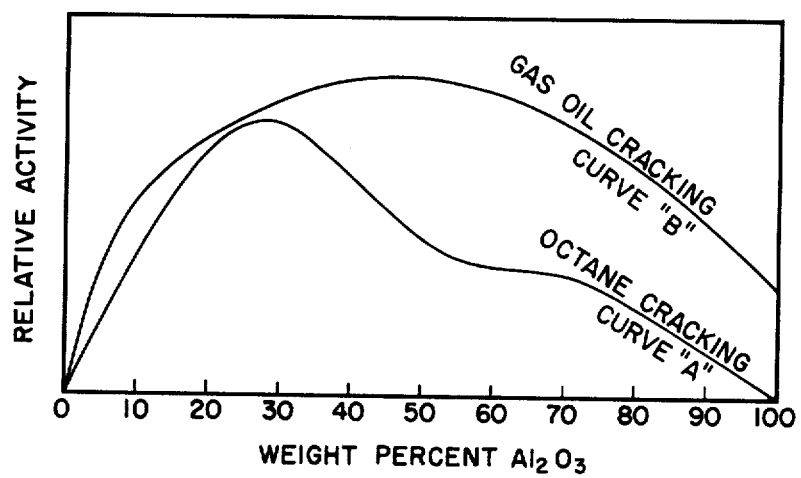
FIG. 1 is a plot showing the relative activity for cracking as the ordinate versus weight per cent alumina in the cracking catalyst as the abscissa.

Curve A of FIG. 1 shows maximum activity for catalytic cracking at an alumina content for the cracking catalyst of about 25 weight per cent. Curve A is based on an article by Holm and Clark, "Journal of Catalysis" Volume 2, page 16, 1963. It is not stated in this article by Holm and Clark that the catalyst was steamed before testing for activity. It is stated that the catalysts were heated in dry air at 550°C. (1,004°F.). Further details on the method of obtaining Curve A can be obtained from the Holm and Clark reference.

Curve B is similar to Curve A except that it shows a maximum for cracking activity at about 50 weight per cent alumina. This curve is based on FIG. 1 of the earlier mentioned C. L. Thomas article from IEC. It is not stated by Thomas whether or not his catalyst was steamed before carrying out his cracking activity tests.

Figure 2:
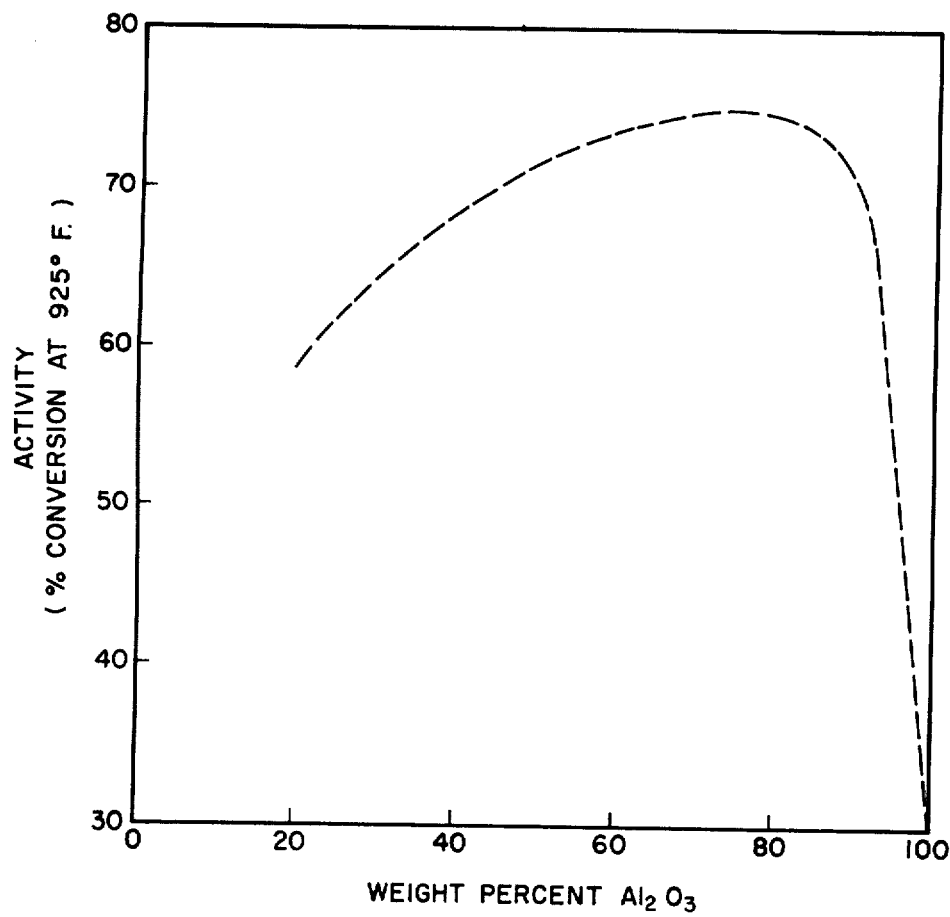
FIG. 2 is a plot similar to FIG. 1, except that FIG. 2 is based on catalysts according to the present invention and wherein the catalysts have been steamed prior to testing the catalyst for activity.

The FIG. 2 data was obtained by performing cracking activity tests on catalysts of various alumina contents. The catalysts were prepared as follows:

An aqueous mixture of aluminum chloride, sodium silicate hydrochloric acid, glacial acetic acid (or other organic acid, e.g., succinic) with pH <2 is prepared. Cogellation is accomplished by adding concentrated ammonium hydroxide solution to raise the pH to 7.0. The precipitate is filtered and dewatered to give an extrudable paste. The paste is formed into extrudate by pressing through an opening at high pressure. The wet extrudates are ion exchanged with ammonium acetate or ammonium carbonate to reduce soda to an acceptable level (<.1%) then washed to remove excess acetate and chloride and finally dried and calcined to burn off residual carbonaceous residues and to activate the catalyst. Crystalline aluminosilicate zeolite may be added at the cogellation stage or afterwards by reslurrying, but before forming extrudate. Before testing, catalysts are pretreated by steaming 6 hours at 1,400°F. in 100% steam atmospheres, 15 psi pressure.

Briefly speaking, it is preferred to prepare the cracking catalyst we use by steps including the following:

a. forming an acidic solution (pH about 1.0) containing aluminum and silicon, for example, by using sodium silicate and aluminum sulphate or alumina dissolved in hydrochloric acid;

b. cogelling aluminum and silicon compounds in the solution by adding a base such as ammonia, ammonium hydroxide or sodium hydroxide (resulting pH about preferably under 7.0, e.g., about 6.2) to thus obtain a catalyst precursor which is believed to be made up of hydroxylated and/or hydrated aluminum or aluminum oxide and silicon or silicon oxide, and c. applying customary steps of filtering, ion-exchanging, washing, drying, and calcining to convert the catalyst precursor into a final catalyst comprising the synthetic silica-alumina.

Less preferable general methods which might be used are along the lines of neutralizing an alkali metal silicate solution with a mineral acid, adding alum solution to the resulting hydrogel to incorporate the requisite amount of alumina in the final catalyst, and precipitating the alum as alumina be the addition of a suitable base.

Other general methods are referred to starting at page 6 of the Ryland et al. article in Emmett's "Catalysis," Volume 7.

Referring again more particularly to FIG. 2, the procedure used in carrying out the catalytic cracking activity tests were as follows:

The reactor we used is a ⅜-inch stainless steel tube that fits into a three-block temperature-controlled furnace capable of maintaining a flat thermal profile. Catalyst volume can be varied up to a 6-cc maximum. With the reactor in place in the furnace, the entire system is purged with nitrogen. At the start of the actual run, the nitrogen purge is stopped. Feed addition is made by means of a variable speed motor-driven syringe pump. The units are equipped with timers and automatic controls to ensure reproducibility of feed volume. A postfeed period nitrogen purge sweeps all unreacted feed and cracked products from the reactor. The reactor effluent is condensed in a receiver maintained at room temperature. Gas liquid separation at normal room temperatures permits essentially complete recovery of $C_4-$ components in the gas phase. The uncondensed gaseous products and postfeed purge nitrogen pass through the condensed liquid in the microreceiver and are collected over brine. The volume and pressure of the gas are noted. Gas samples are then taken for chromatographic analysis. This permits calculation of the weight of the gaseous components in the reaction mix. The liquid collected in the receiver is weighed to the nearest milligram. The receivers are fitted with septums so that the liquid product can be sampled directly with a hypodermic needle and syringe. The withdrawn liquid is injected into a temperature programmed gas chromatograph for a "simulated distillation" type of analysis. Determination of the fraction boiling above "the 430°F cut point " permits calculation of conversion.

Coke deposited on the catalyst is determined by removing it from the reactor after the run and subjecting it to carbon analysis on a LECO carbon analyzer.

Test Conditions

The following operating conditions were typically used:

Catalyst: 3.00 grams, steamed prior to testing
Feed: 1.03 ml of a 625–900°F cut from a Pascagoula gas oil having 24.1°API -continued

| | |
|---|---|
| Temperature: | gravity, and 65°F pour point 925°F |
| WHSV: | 3.72 |
| Cat/Oil Ratio: | 3.23 |

The catalyst charge can be either fluid cracking catalyst or 3/32-inch and smaller pellets, extrudates, or granules. The 625°–900°F gas oil was prepared by a TBP-type distillation thus eliminating any overlap material in the LCO (430°–625°F) boiling range.

Table 2 below summarizes catalysts tested and their relative activity in terms of weight per cent conversion which can be compared to the alumina content of the synthetic silicaalumina catalysts.

TABLE 2

PROPERTIES OF COGELLED SILICA-ALUMINA CATALYSTS
ALL CATALYSTS PRETREATED FOR 6 HOURS AT 1400°F.
WITH STEAM

| Catalyst | $Al_2O_3$, Wt % | Bulk Density, g/cc | Activity, Wt % Conversion |
|---|---|---|---|
| B-298-48 | 100 | 0.82 | 31.6 |
| B-298-49 | 85 | 0.84 | 73.8 |
| B-658-6B | 75 | 0.69 | 74.1 |
| B-298-14E | 72 | 0.90 | 79.3 |
| DC-194 | 60 | 0.77 | 74.6 |
| B-298-19D | 60 | 0.78 | 73.8 |
| B-298-17E | 50 | 0.76 | 72.8 |
| DC-195 | 40 | 0.76 | 69.8 |
| JC-185 | 30 | 0.86 | 65.8 |
| B-298-38E | 25 | 0.97 | 63.1 |
| CRC-151 | 10 | 0.65 | 51.0 |
| Davison GR-12 | 0 | 0.73 | 6.8 |

As can be seen from the data in Table 2 and the results as graphically presented in FIG. 2, an especially preferred catalytic cracking catalyst is synthetic silica-alumina containing between 60 and 75 weight per cent alumina. In view of the prior art, the especially high activity found for these catalysts is a surprising result which could not be predicted.

What is claimed is:

1. A process for catalytic cracking of a hydrocarbon feedstock which comprises contacting the feedstock with a catalyst which consists essentially of a simultaneously cogelled synthetic silica-alumina containing 56 to 90 weight percent alumina, said catalyst having been steamed at about 1,400°F, and said process producing relatively high yields of $C_3$ and $C_4$ olefins.

2. A process in accordance with claim 1 wherein the catalyst contains at least 60 weight per cent alumina.

3. A process in accordance with claim 1 wherein the catalyst contains at least 65 weight per cent alumina.

4. A process in accordance with claim 1 wherein the catalytic cracking conditions include a temperature between 800° and 1,200°F., a pressure between atmospheric and 200 psig, and a hydrocarbon feedstock boiling within the limits of about 150°F. to 1,000°F.

5. A process in accordance with claim 4 wherein the catalyst which is used to contact the feedstock is a catalyst prepared by the steps comprising
   a. forming an acidic solution containing aluminum and silicon;
   b. cogelling aluminum and silicon compounds in the solution by adding a base to obtain a catalyst precursor; and
   c. ion-exchanging, washing, drying, calcining and steaming the catalyst precursor.

* * * * *